(12) United States Patent
Jones et al.

(10) Patent No.: US 8,054,853 B2
(45) Date of Patent: Nov. 8, 2011

(54) SYSTEMS AND METHODS FOR COMBINING TIME DIVISION MULTIPLEXED AND PACKET CONNECTION IN A MESHED SWITCHING ARCHITECTURE

(75) Inventors: John Patrick Jones, Westford, MA (US); Timothy L. Norman, Ottawa (CA); Alan Chin-Luen Chan, Kanata (CA)

(73) Assignee: Ciena Corporation, Linthicum, MD (US)

( * ) Notice: Subject to any disclaimer, the term of this patent is extended or adjusted under 35 U.S.C. 154(b) by 635 days.

(21) Appl. No.: 11/796,770

(22) Filed: Apr. 30, 2007

(65) Prior Publication Data

US 2008/0181203 A1 Jul. 31, 2008

Related U.S. Application Data

(63) Continuation-in-part of application No. 11/699,250, filed on Jan. 29, 2007.

(51) Int. Cl.
*H04L 12/43* (2006.01)
(52) U.S. Cl. ............... 370/458; 370/423; 370/427
(58) Field of Classification Search .................. 370/386, 370/389, 423, 424, 427, 536, 257, 458, 321
See application file for complete search history.

(56) References Cited

U.S. PATENT DOCUMENTS

| 5,751,710 A * | 5/1998 | Crowther et al. ............. 370/423 |
| 2004/0105459 A1* | 6/2004 | Mannam ....................... 370/465 |
| 2005/0099970 A1* | 5/2005 | Halliday ....................... 370/321 |

* cited by examiner

*Primary Examiner* — Huy Vu
*Assistant Examiner* — Dady Chery
(74) *Attorney, Agent, or Firm* — Clements Bernard PLLC; Christopher L. Bernard; Lawrence A. Baratta, Jr.

(57) ABSTRACT

The present invention provides systems and methods for supporting native TDM and native Packet switching simultaneously in a meshed switching architecture. Specifically with the present invention, the meshed links are common to both TDM and packet traffic, and both types terminate to a common system interface without the need to separate physical resources and infrastructure; the common termination function has access to both the TDM (Time Slot Interchange (TSI)) switching and packet switching elements. Native TDM switching and packet switching operate in concurrently in the mesh over common links, with the personality of the links derived by the card type (attached to the mesh). In this, a given card or slot in a system can communicate in the native format to both packet based cards (slots) or TDM based cards (slots) simultaneously with no preconceived restrictions or limitations on slot or link definition.

18 Claims, 11 Drawing Sheets

SYSTEMS AND METHODS FOR COMBINING TIME DIVISION MULTIPLEXED AND PACKET CONNECTION IN A MESHED SWITCHING ARCHITECTURE

CROSS-REFERENCE TO RELATED APPLICATION(S)

This application is a continuation-in-part of co-pending U.S. patent application Ser. No. 11/699,250 filed Jan. 29, 2007, and entitled "SYSTEMS AND METHODS FOR A HIERARCHICAL LAYER ONE AND LAYER TWO CROSS-CONNECT IN A TRANSPORT AND AGGREGATION PLATFORM," the contents of which are incorporated in full by reference herein.

FIELD OF THE INVENTION

The present invention relates generally to communication networks. More specifically, the present invention provides systems and methods for combining time division multiplexed (TDM) and packet connections in a meshed backplane switching architecture allowing TDM and packet connections to share common links without a separate infrastructure.

BACKGROUND OF THE INVENTION

A transport and aggregation network includes network elements which offer transport and aggregation of services, such as SONET/SDH, Optical Transport Network (OTN), Ethernet, Storage Area Network (SAN), Video, and the like. Service providers and enterprises deploy such networks to provide connectivity. Typically, when TDM and packet (e.g., Ethernet) connections are co-resident on a given card or system, they physically use separate infrastructure on the card or system, such as a unique TDM fabric and a unique packet fabric each with physically separate interfaces. This is the case for a transport and aggregation network element with either a central fabric or meshed configuration. Additionally, systems originally designed for only one traffic type may not have planned for separate interfaces. For example, a transport and aggregation platform may have been deployed with wavelength division multiplexing (WDM) solely to transport and aggregate SONET/SDH traffic, and to add packet connections, a new system or switch fabric must be installed along with the existing platform. With separate infrastructure, comes an increase in cost (e.g., distinct TDM and packet switches). Note, this also assumes that the platform (new or legacy) has been designed with forethought to accommodate both sets of infrastructure.

In systems that do not accommodate distinct separate physical interfaces for TDM and packet, mixing native packet traffic (Open Systems Interconnect (OSI) layer two) and native TDM (OSI layer one) traffic over a common physical interface is difficult, since formats and requirements differ between the types of traffic. This is complicated further when both traffic types need access to a shared resource such as a packet processor which may not be able to dedicate separate interfaces to the traffic flows.

Existing TDM systems offer packet connections with TDM through protocols such as Packet-over-SONET (POS), Virtual Concatenation (VCAT), Generic Framing Procedure (GFP), High-Level Data Link Control (HDLC), Point-to-Point Protocol (PPP), and the like. However, these protocols either provide dedicated point-to-point connections or offer limited layer two switching capabilities.

Ethernet increasingly is being considered as a replacement to SONET/SDH for metropolitan and wide-area transport and aggregation networks. Where SONET/SDH traditionally was designed for efficient multiplexing and transport of TDM-oriented traffic, Ethernet is considered as the transport solution for packets. Thus systems and methods for combining TDM and packet connections in a single system simultaneously in a meshed switching architecture are needed.

BRIEF SUMMARY OF THE INVENTION

In various exemplary embodiments, the present invention provides systems and methods for supporting native TDM and native Packet switching simultaneously in a meshed switching architecture. Specifically, in accordance with the present invention, the meshed links are common to both TDM and packet traffic, and both types terminate to a common system interface without the need to separate physical resources and infrastructures; the common termination function has access to both the TDM (Time Slot Interchange (TSI)) switching and packet switching elements. Native TDM switching and packet switching operate concurrently in the mesh over common links, with the personality of the links derived by the card type (attached to the mesh). In this, a given card or slot in a system can communicate in the native format to both packet-based cards (slots) or TDM-based cards (slots) simultaneously with no preconceived restrictions or limitations on slot or link definition.

Advantageously, the meshed switching architecture of the present invention allows combining TDM and packet over a common interface. In the case of a legacy system without a separate TDM and packet bus, the present invention allows a seamless upgrade to support TDM and packet over a common interface. In a new system, the present invention avoids the cost and complexity of routing separate physical interfaces. In either case, the present invention allows flexibility for both equipment vendors and service providers to support upgrades and mixed traffic options. This approach allows a common packet processing engine to terminate user ports arriving over TDM channels, and packet connections, concurrently over a common interface.

In an exemplary embodiment of the present invention, a meshed switching architecture supporting time division multiplexed and packet connections over common links includes a plurality of connections in a mesh configuration between a first slot and one or more slots, and first circuitry on the first slot and each of the one or more slots connected to the plurality of connections, wherein the first circuitry is configured to provide an interface between each of the plurality of connections and between second circuitry on the first slot and each of the one or more slots, wherein the second circuitry includes packet processing circuitry and time slot mapping circuitry, and wherein the plurality of connections support packet and time division multiplexed connections. The plurality of connections are over a backplane. Optionally, the first circuitry is a field programmable gate array. The first circuitry is configured to on a per-meshed connection to operate in a time division multiplex only mode supporting only time division multiplex connections with time slot interchange functionality, operate in a bypass mode supporting only packet connections bypassing time slot interchange functionality, and operate in a hybrid mode with both time division multiplex with time slot interchange functionality and packet connections. The meshed switching architecture further includes a plurality of logical and physical channels, wherein in the hybrid mode, each of the plurality of logical and physical channels is classified one of packet and time division multiplex, and wherein the circuitry processes each of the plurality of logical and physical channels according to the classification. The first circuitry is configured to provide packet connections to a network processor through a system packet interface, frame packet connections in a Generic Framing Protocol-Frame format, and provide time division multiplexed connections to circuitry configured to perform time slot interchange functionality. Each of the plurality of connections includes a serialized-de-serialized (SerDes) connection, and wherein the first slot includes a SerDes connection to each of the one or more slots. The time division multiplexed connections utilize Optical Transport Network framing.

In another exemplary embodiment of the present invention, a meshed switching circuit supporting time division multiplexed and packet connections over common links includes a plurality of serializer/de-serializers (SerDes) configured to transmit and receive a plurality of packet and time division multiplexed connections, a packet interface configured to transmit and receive the plurality of packet connections to packet processing circuitry external to the circuit, and a port interface configured to transmit and receive the plurality of time division multiplexed to circuitry for time slot interchange switching, wherein the plurality of SerDes connect to a backplane in a mesh configuration. The circuit is located on a card which connects to the backplane. The backplane connects a plurality of cards with each of the plurality of cards connecting to the remaining plurality of cards through one of the plurality of SerDes. The packet interface includes a System packet interface, and the packet processing circuitry includes a network processor. The circuit is configured to on a per-meshed connection to operate in a time division multiplex only mode supporting only time division multiplex connections with time slot interchange functionality, operate in a bypass mode supporting only packet connections bypassing time slot interchange functionality, and operate in a hybrid mode with both time division multiplex and packet connections. The time division multiplexed connections utilize Optical Transport Network framing.

In yet another exemplary embodiment of the present invention, a network element with a meshed backplane switching architecture supporting time division multiplexed and packet connections over common links includes a plurality of slots connected through a backplane, a plurality of line cards configured to connect to the backplane each through one of the plurality of slots, wherein each of the plurality of line cards includes a Fabric-Timeslot Exchanger circuit configured to serialize and de-serialize a plurality of connections to the backplane, wherein the connections include time division multiplexed and packet connections, interface packet connections to an external packet processor through a system packet interface, frame packet connections into Generic Frame Protocol-Frame (GFP-F), perform time slot switching for the time division multiplexed connections, and combine the packet and time division multiplexed connections over the plurality of connections. The time slot switching includes switching Optical channel Payload Virtual Containers. Each of the plurality of line cards connects to the each of the other plurality of line cards through one of the plurality of connections. The plurality of connections form a meshed backplane switching architecture.

BRIEF DESCRIPTION OF THE DRAWINGS

The present invention is illustrated and described herein with reference to the various drawings, in which like reference numbers denote like system components and/or method steps, respectively, and in which.

DETAILED DESCRIPTION OF THE INVENTION

In various exemplary embodiments, the present invention provides systems and methods for supporting native TDM and native Packet switching simultaneously in a meshed switching architecture. Specifically, in accordance with the present invention, the meshed links are common to both TDM and packet traffic, and both types terminate to a common system interface without the need to separate physical resources and infrastructure; the common termination function has access to both the TDM TSI switching and packet switching elements. Native TDM switching and packet switching operate concurrently in the mesh over common links, with the personality of the links derived by the card type (attached to the mesh). In this, a given card or slot in a system can communicate in the native format to both packet-based cards (slots) or TDM-based cards (slots) simultaneously with no preconceived restrictions or limitations on slot or link definition.

Advantageously, the meshed switching architecture of the present invention allows combining TDM and packet over a common interface. In the case of a legacy system without a separate TDM and packet bus, the present invention allows a seamless upgrade to support TDM and packet over a common interface. In a new system, the present invention avoids the cost and complexity of routing separate physical interfaces. In either case, the present invention allows flexibility for both equipment vendors and service providers to support upgrades and mixed traffic options. This approach allows a common packet processing engine to terminate user ports arriving over TDM channels, and packet connections, concurrently over a common interface.

Figure 1:
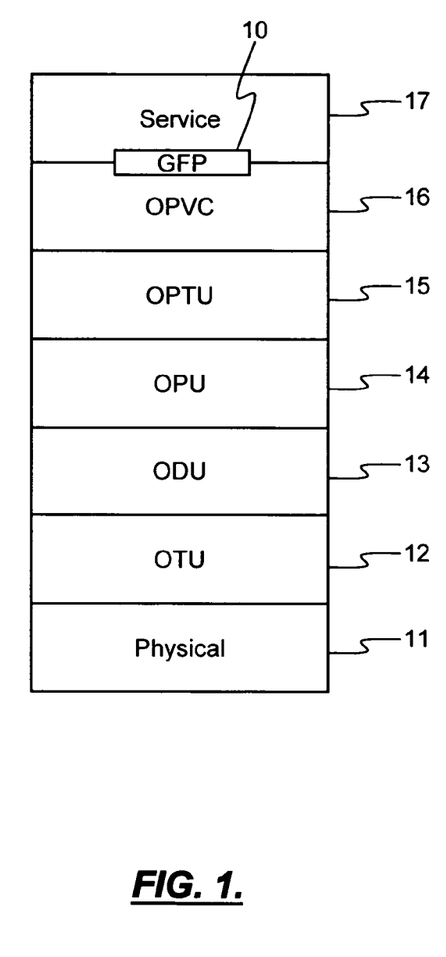
FIG. 1 is a logical diagram of the OSI stack modified to illustrate the OTN layers.

Referring to FIG. 1, a logical diagram is illustrated showing the OTN layers. OTN includes a set of ITU-T standards, such as ITU-T Recommendations G.709 and G.798, which are incorporated in-full by reference herein, defining a set of Optical Network Elements connected by optical fiber links, able to provide functionality of transport, multiplexing, routing, management, supervision and survivability of optical channels carrying client signals. In one exemplary embodiment, the present invention utilizes the OTN framework to support meshed links that are common to both TDM and packet traffic, and both types terminate a common system interface without the need to separate physical resources and infrastructures; the common termination function has access to both the TDM (TSI) switching and packet switching elements.

A service layer 17 represents the end user service, such as Gigabit Ethernet (GbE), Synchronous Optical Network (SONET), Synchronous Digital Hierarchy (SDH), Fiber Channel (FC), Enterprise Systems Connection (ESCON) and the like. Asynchronous services, such as GbE, FC, ESCON, and the like, are passed through a Generic Frame Protocol (GFP) mapper 10. The GFP mapper 10 can be configured to adapt a wide variety of data signals to transport networks, and can be compliant with ITU-T Recommendation G.7041, which is incorporated in-full by reference herein. An Optical channel Payload Virtual Container (OPVC) 16 handles mapping the service from the service layer 17 to a uniform format. This is the only layer that needs to change to support a new service type. An Optical channel Payload Tributary Unit (OPTU) 15 maps the output of the OPVC 16 into a timeslot and performs timing adaptations to unify the clocking. An Optical channel Payload Unit (OPU) 14 contains all of the timeslots in an OTN frame. An Optical channel Data Unit (ODU) 13 proves the path-level transport functions of the OPU 14. An Optical Transport Unit (OTU) 12 provides the section-level overhead for the ODU 13 and provides GCC0 bytes. Finally, a physical layer 11 maps the OTU 12 into a wavelength or a wavelength division multiplexing (WDM) system for transmission.

Figure 2:
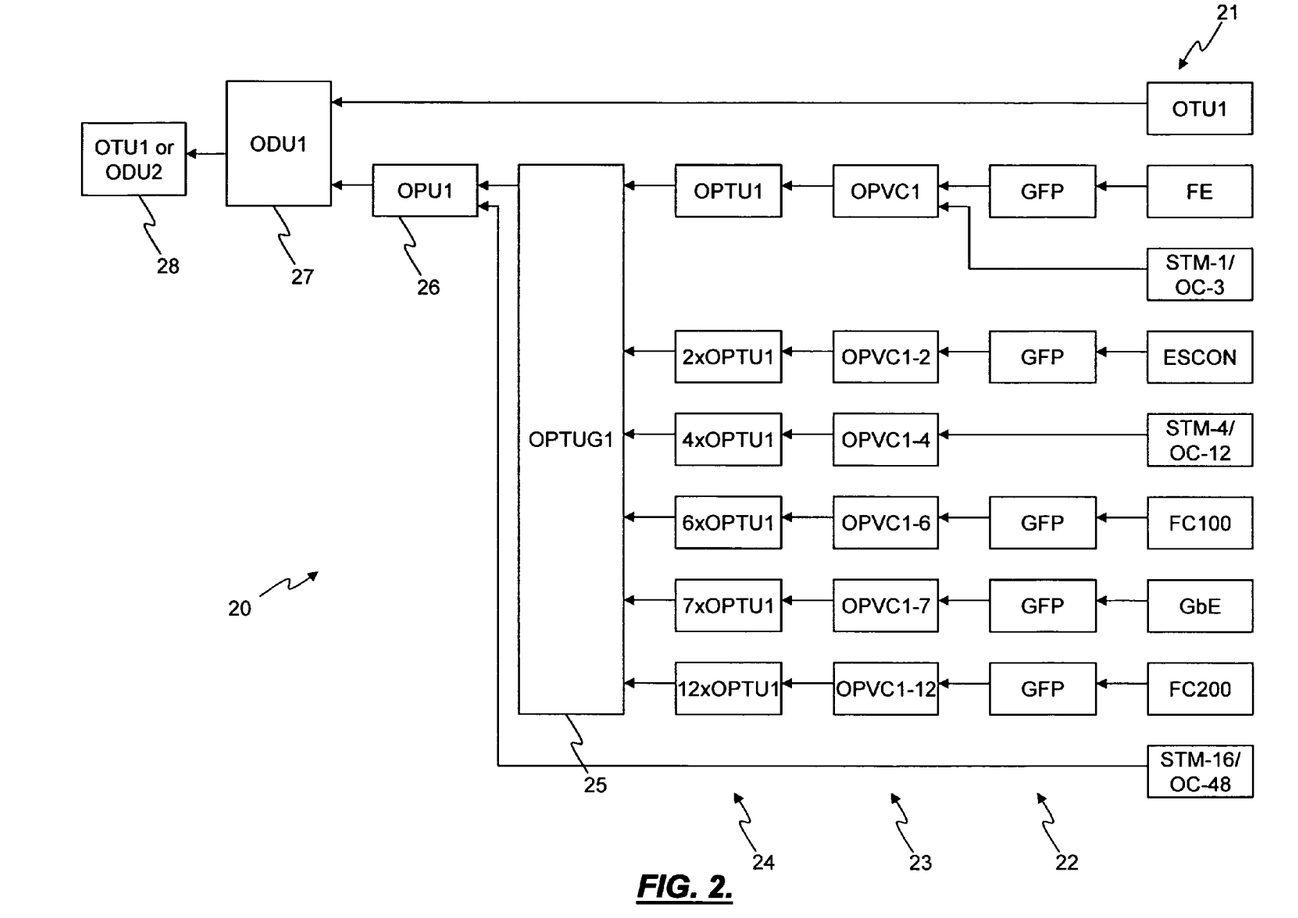
FIG. 2 is an exemplary mapping diagram illustrating service mappings into the OTN framework.

Referring to FIG. 2, an exemplary mapping diagram 20 illustrates service mappings into the OTN framework. Various services 21, such as STM-1/OC-3, Fast Ethernet (FE), OTU1, ESCON, STM-4/OC-12, Fiber Channel (FC100/FC200), GbE, STM-16/OC-48, and the like, are either mapped directly into OPVC 23 containers if synchronous or are first mapped with GFP 22 if asynchronous. As illustrated in diagram 20, different levels of OPVCs 23 are required for different services 21, and the OPVCs 23 are virtual containers which are concatenated to fit the services 21 bandwidth. For example, an STM-4 will require four OPVCs 23. Each OPVC 23 is able to contain up to 155 Mb/s. Next, the OPVCs 23 are mapped into OPTUs 24 where pointer processing is performed to adapt to node timing, and then they are multiplexed into OPTUG1 25. Then, the OPTUG1 25 is mapped into an OPU1 26, and also an STM-16/OC-48 21 service is directly mapped to the OPU1 26. After that, the OPU1 26 is mapped to an ODU1 27, and also an OTU1 21 service is directly mapped into the ODU1 27. Finally, the ODU1 is mapped to an OTU1 or ODU2 28.

Figure 3:
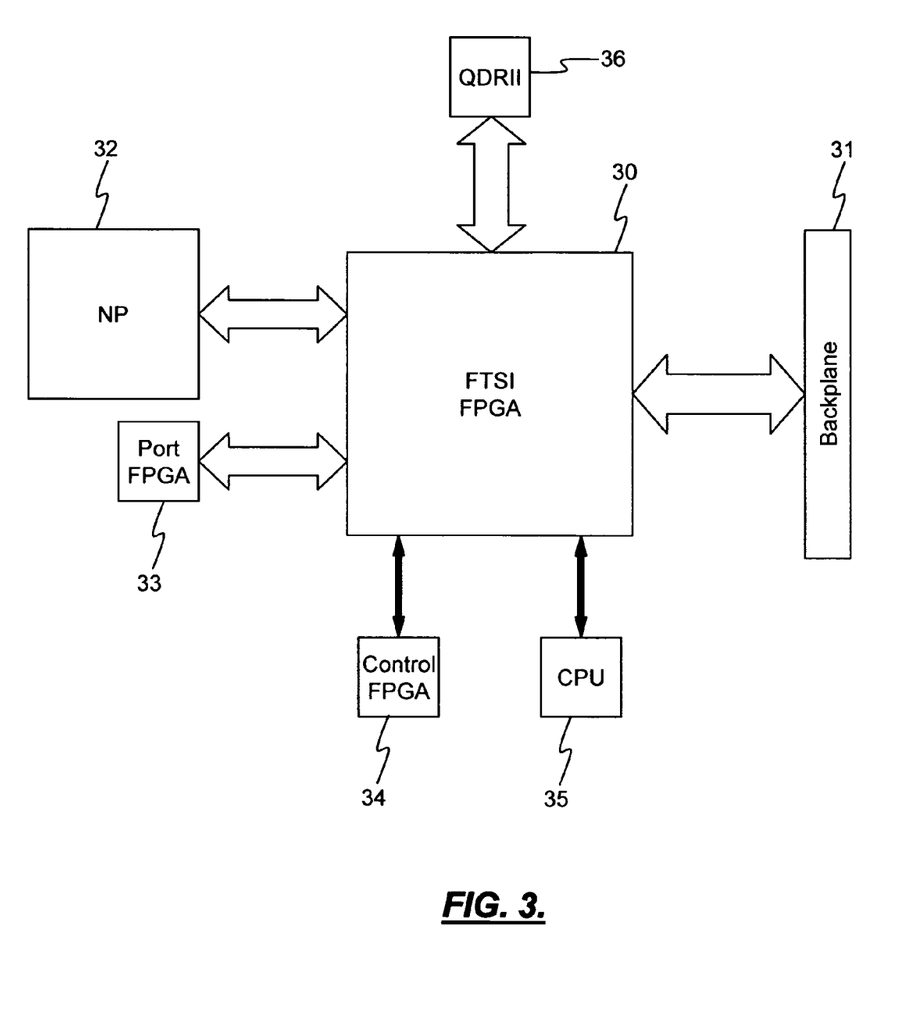
FIG. 3 is block diagram of the interfaces to a FTSI FPGA according to an exemplary embodiment of the present invention.

Referring to FIG. 3, a Fabric-Timeslot Exchanger (FTSI) Field Programmable Gate Array (FPGA) 30 is illustrated according to an exemplary embodiment of the present invention. The FTSI 30 provides for time division multiplexing (TDM) and native Packet switching simultaneously in a meshed switching architecture. The FTSI FPGA 30 is configured to reside on a line card in a network element, such as a packet card, switch card, a TDM card, or combinations thereof. The FTSI FPGA 30 provides packet link between a network processor (NP) 32 and a backplane 31 and a TDM link between a port FPGA 33 and the backplane 31 on the network element. The port FPGA 33 provides mapping of TDM traffic. The NP 32 sends packets via a connection, such as a System Packet Interface 4.2 (SPI-4.2) interface, to the FTSI 30, which are framed into Generic Framing Protocol-Frame (GFP-F), and mapped into timeslots, such as Optical channel Payload Virtual Containers (OPVCs). In the Optical Transport Network (OTN) framework, the OPVC handles mapping a service into a uniform format, and the OPVC is the only layer that needs to change to support a new service type. The FTSI 30 includes a timeslot interchanger (TSI) to perform timeslot switching before passing the traffic to the backplane 31 via internal Serializer/De-serializer (SerDes) transceiver devices.

In an exemplary embodiment of the present invention, the FTSI 30 is configured to perform the following high-level functions: providing a packet interface (SPI4.2) to the NP 32 processor, providing one ODU1 link to the Port FPGA 33, switching TDM traffic (from the Port FPGA 33) and passing it to the backplane 31, and framing, with GFP-F, the packets from the NP 32 processor and mapping them into an OPVC. Additionally, the FTSI 30 can operate in a Bypass Mode where packets are passed to the backplane 31 without framing them in an ODU1. Also, the FTSI 30 can operate in a Hybrid Mode where one TDM port (from the Port FPGA 33) is linked to one SerDes on the backplane 31 via TSI and maps the packets to three other SerDes devices on the backplane 31. Also, the Hybrid mode can include all packets interfaced from the NP 32 with some mapped into TDM slots and some bypassed, but all go to the same destination slot. As described further herein, the FTSI 30 groups three (or more) SerDes devices to form a meshed switching architecture to the backplane 31.

The physical interfaces of FTSI FPGA 30 are the NP 32 Processor (such as a NP2/10-B0 available from EZ Chip), the Port FPGA 33, QDRII memory interfaces 36 and the backplane interface 31. Additionally the FTSI FPGA 30 communicates with a Control FPGA 34 and a processor (CPU) 35.

The NP 32 processor includes integrated traffic management capabilities with traditional NP classification functions. The FTSI FPGA 30 can connect to the NP 12 through a SPI4.2 interface on the NP 32. The FTSI FPGA 30 connects to the Port FPGA 33 via a source synchronous Low voltage differential signaling (LVDS) interface. The data format is ODU1. The Port FPGA 33 is configured for TDM mapping.

The backplane 31 PHY interface to the FTSI FPGA 30 is via internal SerDes transceiver devices. In an exemplary embodiment, there are 12 SerDes channels for each direction. Channels are grouped in bundle of four and each channel runs at 3.125 Gbps on the backplane 31 side. On the logic side, each channel is 16 bits wide plus 2 control bits and runs at 156.25 MHz. Since the transceivers of FTSI FPGA 30 can run at a maximum rate of 6.375 Gbps, the data rate can be increased.

Figure 4:
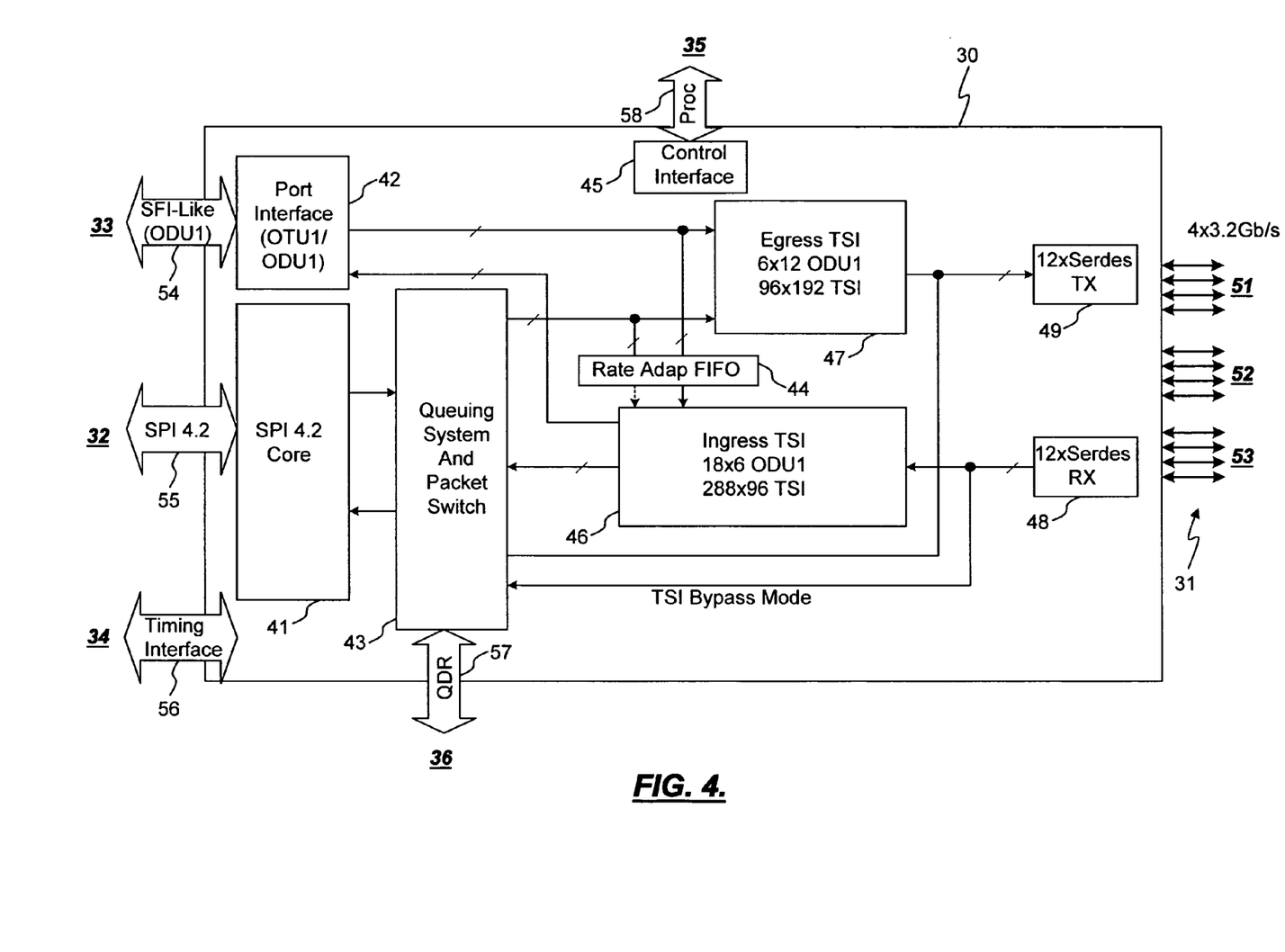
FIG. 4 is a block diagram of an exemplary embodiment of the Fabric-TSI (FTSI) interface FPGA.

Referring to FIG. 4, an exemplary embodiment of the Fabric-TSI (FTSI) interface FPGA 30 is illustrated according to the present invention. The FTSI 30 provides TDM and packet connectivity for a mesh switching fabric. Its purpose is to provide, TDM switching using an Ingress and Egress TSI FPGA 46,47, GFP-F framing, and OPVC1 mapping, and packet mapping and flow control. Note, there is no flow control when operating solely in a TDM mode. The FTSI 30 can be run in three modes including TDM, Time Slot Interchange (TSI) Bypass, and hybrid (TDM/Packet) mode. Functions in the FTSI 30 include an SPI 4.2 Core 41, a port interface 42, a queuing system and packet switch 43, a rate adaptor First-In, First-Out (FIFO) 44, a control interface 45, an Ingress TSI 46, an Egress TSI 47, and SerDes RX and TX 48,49.

The FTSI 30 interface supports integrated SerDes 48,49 functionality. Note, Ingress 46 and Egress 47 are defined relative to the backplane 31. The FTSI 30 supports multiple 4×3.2 Gb/s SerDes links 51,52,53 for a fabric thread. For example, the FTSI 30 can support three sets of threads per FPGA to provide a total of 12 SerDes 48,49 connections (each connection is 3.2 Gb/s). The backplane links 51,52,53 are used to interconnect to FTSIs 30 on other modules to form the meshed switching architecture. In the Bypass mode, the SerDes 48,49 connect directly to the queuing system and packet switch 43, avoiding the TSIs 46,47. This mode is applicable when the SerDes 48,49 connect to another data card with an FTSI configured in Bypass mode for packet-only connections.

The datapath for the TDM mode supports GFP-F virtual circuit group (VCG) ports, each mapped to a distinct logical and physical channel (hereinafter referred to as a "MPHY"). Each ODU1 contains up to 16 timeslots (OPVC), and each OPVC can be a channel or part of a VCG (i.e., n×OPVC). Both contiguous and non-contiguous timeslots are supported in a VCG group. The TSIs 46,47 connect to the SerDes 48,49 to transmit and receive threads from the backplane links 51,52,53. The Egress TSI 47 includes queues to the backplane to avoid underruns during transfers and bad packets. The Ingress and Egress TSIs 46,47 connect to the port interface 42, such as an OTU1 or ODU1. This provides an SFI-like connection 54 off the FTSI 30 to interface TDM traffic to a Port FPGA for mapping.

The Hybrid (TDM/Packet) mode allows combined TDM and packet connections on the SerDes transceivers 48,49 and links 51,52,53. Advantageously, the TDM portion is similar to the TDM-only mode, and the packet portion is similar to the Bypass mode. The links 51,52,53 are separated between TDM and packet, sending the corresponding connection to either the TSIs 46,47 or the queuing system and packet switch 43. From there, packets are connected to the NP 32, and TDM connections to the port FPGA 33. The packet and TDM modes are concurrent, configurable per thread. End-to-End Flow-control (backpressure) is only applicable for packet modes. The FTSI 30 is responsible for cHEC and CRC generation and insertion egress (to backplane 31 from NP 32), and for stripping CRC and GFP-F on ingress (from backplane 31 to NP 32). Additionally, the TSIs 46,47 connect to the queuing system and packet switch 43 to provide terminated channels in GFP-F mode (i.e., GFP-F mapped Ethernet). Additionally, the FTSI 30 receives a timing interface 54, such as from the Control FPGA 34, a processor connection 58 to a control interface 45, and a QDR connection 57 from the queuing system and packet switch 43 to memory 36.

Figure 5:
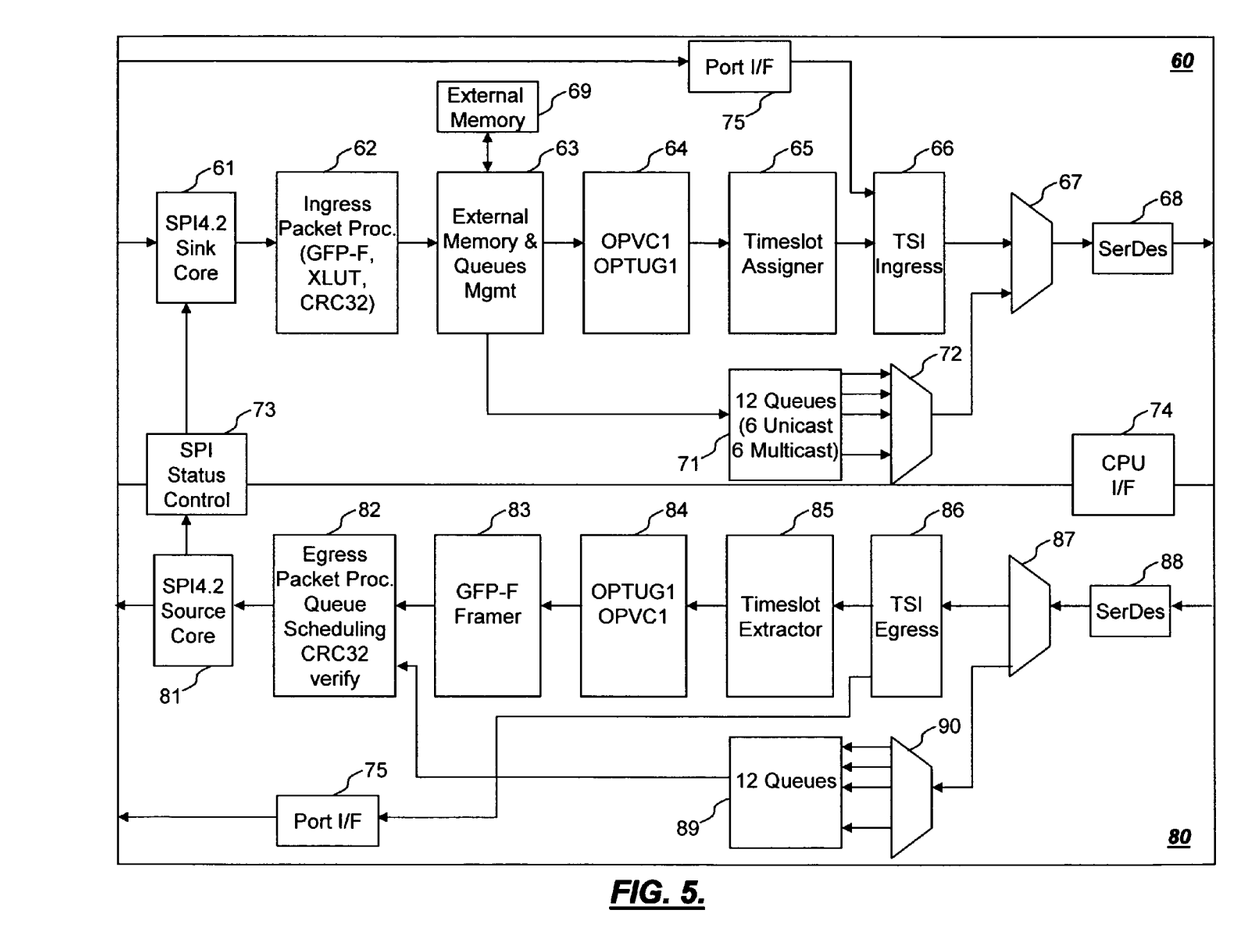
FIG. 5 is a detailed functional block diagram of the FTSI FPGA according to an exemplary embodiment of the present invention.

Referring to FIG. 5, a detailed functional block diagram of the FTSI FPGA 30 is illustrated according to an exemplary embodiment of the present invention. For illustration purposes, the FTSI 30 block diagram is separated into an ingress section 60 and an egress section 80. The FTSI 30 connects to a backplane through SerDes 68,88 and to a port interface 75 and SPI 4.2 Sink/Source Cores 61,81. Functionally, the FTSI 30 is configured to transmit and receive TDM, packet, or both types of connections to/from the backplane. The port interface 75 connects TDM traffic to an external switching block for time slot switching, and the SPI 4.2 Sink/Source Cores 61,81 interface to an external network processor for packet processing. The packet connections can be sent directly to the network processor in a Bypass mode, or extracted from OPVC timeslots if contained as part of a TDM connection.

The ingress section 60 receives packet connections from an external device, such as a network processor, at the SPI 4.2 Sink Core 61 and TDM connections from an external device, such as a Port FPGA, at the port interface 75. The port interface 75 provides the received TDM connections to a TSI ingress 66 block. The Sink Core 61 block receives data from a NP processor and sends it to an Ingress Packet Processor 62. For example, the data is received by the Core 61 using a 16-bit SPI interface. The Ingress Packet Processing 62 block receives data from the SPI Sink Core 61 and performs further processing, such as MPHY Translation (e.g., translation for Unicast packets), MAC CRC32 calculation (e.g., generating MAC CRC32 for each MPHY destination (queue) and outputting the generated value when end-of-packet (EOP) is asserted, and finally GPF-F Header Processing.

an exemplary embodiment, there are 20 MPHYs coming from the NP. The MPHYs can be arranged as follows: TDM/TSI (MPHY number 0-11) and Bypass (MPHY number 12-19). While there is data to be sent from the NP, the Ingress Packet Processor 62 will accept it. Further processing depends on the MPHY, and therefore type, of data coming in. If the packet belongs to the BYPASS group (MPHY 12-19) the header will be translated with the MPHY translation. If the packet belongs to the TDM groups (MPHY 0-11), then no MPHY translation is done. The payload portion of the data stream (excluding TDM MPHY 0-11, GFP-F header word) is passed through the MAC CRC32 block which keeps track of the ongoing CRC32 values for each MPHY. It also responds with the final MAC CRC value on the assertion of EOP. Final MAC CRC values are also written into the QDR memory for that queue. If the packet belongs to the TDM group and if the start-of-packet (SOP) signal is asserted then its first word (64 bits) will be the GFP-F empty header (32 bit Core Header and 32 bits Payload Header) pre-pended by the NP. This header is then processed by the GFP-F block.

The External Memory & Queues Management block 63 records all necessary information, including the address offset of each queue in the external memory 69, the current read and write pointers, the location of the last SOP for each queue, and the number of complete packets available in the queue. Initially the external memory 69 space is divided equally between the 20 MPHY queues. An OPVC1/OPTUG1 multiplexer 64 is a timeslot multiplexer that performs the mapping from client signal to OPTUG1. It is the logic that does the ODU1 channelization. A Timeslot Assigner module 65 multiplexes the outputs of the OPVC1/OPTUG1 multiplexer 64 into streams of ODU1s. The TSI ingress block 66 receives ODU1 outputs from the Timeslot Assigner module 65 and from the port interface 75, and provides these to a multiplexer 67 followed by the SerDes 68 to the backplane.

Twelve Queues 71 are connected to the External Memory & Queues Management block 63 for the Bypass mode where data packets are directly transmitted to another FTSI 30 module resident on another line card. The Bypass Mode bypasses the TSI functions and is intended for direct packet transmission. Queues 71,89 can support six MPHYs for unicast and two MPHYs for multicast on ingress, and six MPHYs for unicast and six MPHYs for multicast on egress. Additionally, the Bypass Mode supports individual flow control for each egress MPHY, bypassing the TSI, switching multicast MPHY to backplane ports based on translation look up table (XLUT) from packet header, handling whole packet with variable sizes, supporting end-to-end flow control, four lane channel bonding for each 10G backplane slot, and verification for packet protection across the backplane, and supporting performance and error counters per MPHY. The queues 71 connect to a multiplexer 72 which connects to the multiplexer 67.

The egress section 80 transmits packet connections to an external device, such as a network processor, at the SPI 4.2 Source Core 81 and TDM connections to an external device, such as a Port FPGA, at the port interface 75. The SerDes 88 receives connections (e.g., packet and TDM) from the backplane and provides them to a de-multiplexer 87 which provides Bypass packet traffic to a de-multiplexer 90 and TDM/Hybrid packet traffic to a TSI Egress block 86. The TSI Egress block 86 provides ODU1 outputs to a Timeslot Extractor 85 which extracts the ODU1 outputs and sends them to an OPVC1/OPTUG1 de-multiplexer 84. A GFP-F framer 83 provides GFP-F de-framing of input data streams. An Egress Packet Processor block 82 provides queuing, scheduling and CRC32 verification prior to sending the packets to the Source Core 81. In the Bypass Mode, packet traffic is sent to a de-multiplexer 90 to twelve queues 89 and then directly to the Egress Packet Processor block 82. Also, TDM-only traffic is sent from the TSI Egress 86 directly to the port interface 75. Additionally, control functions include an SPI Status Control 73 and a processor interface 74, both shared between the ingress 60 and egress 80 functions. In an exemplary embodiment, the FTSI FPGA 30 is an Altera Stratix II GX FPGA or a Xilinx Virtex 4 device.

Figure 6:
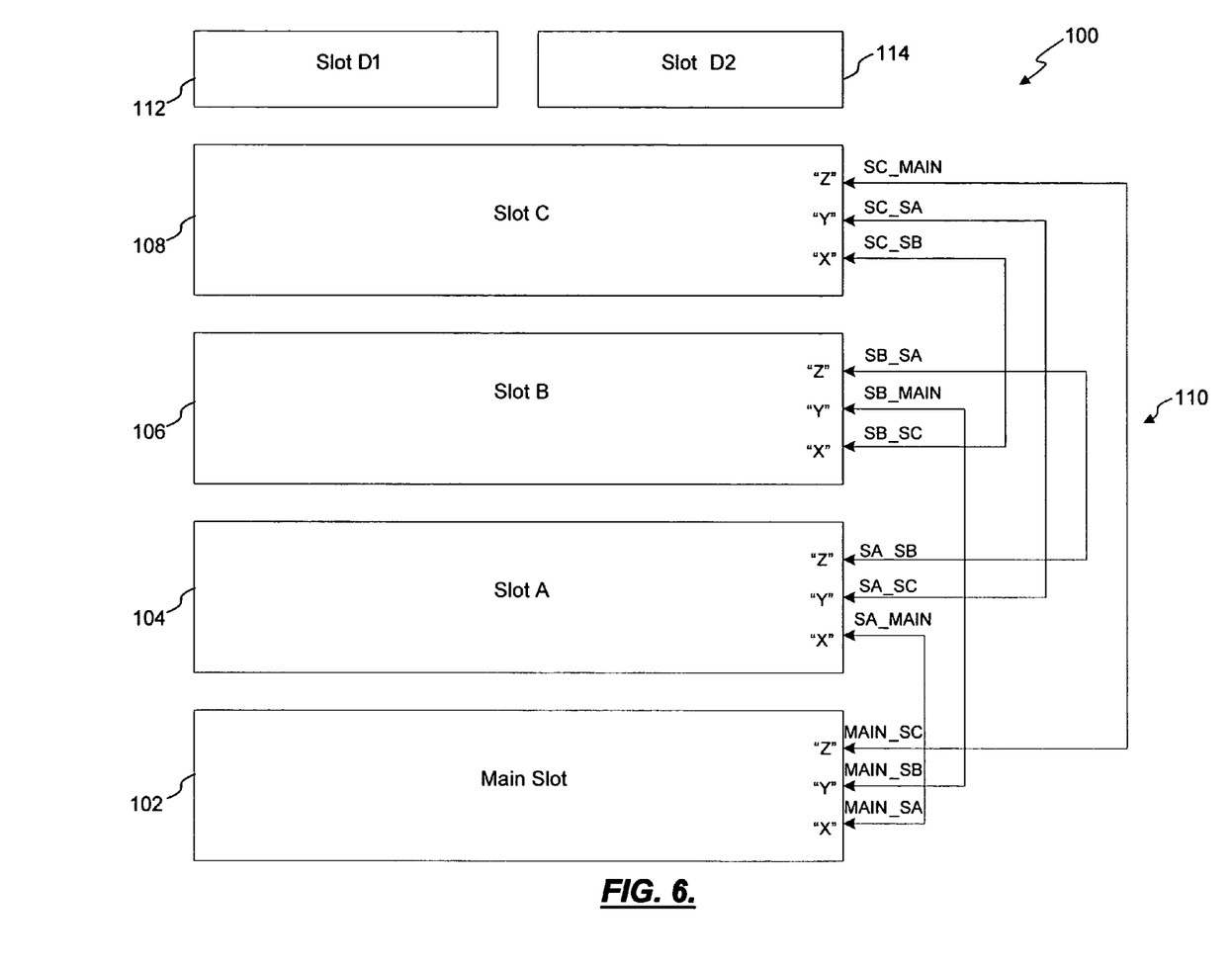
FIG. 6 is a block diagram of a network element including multiple slots connected through a backplane in a meshed switching architecture according to an exemplary embodiment of the present invention.

Referring to FIG. 6, a network element 100 is illustrated including multiple slots 102,104,106,108,112,114 connected through a backplane 110 in a meshed switching architecture according to an exemplary embodiment of the present invention. In this example on the backplane 100, the slots are MAIN 102, A 104, B 106, and C 108. Each slot 102,104,106, 108 contains a board-level SerDes, such as on a FTSI FPGA as described herein. The SerDes are labeled X, Y, and Z for each slot. Each of the X, Y, and Z SerDes connections to the backplane 110 can include four 3.125 Gb/s connections, such as depicted in connections 51,52,53 in FIG. 4. For example, the MAIN slot 102 can have its X SerDes connect to the A slot 104 X SerDes, its Y SerDes connect to the B slot 106 Y SerDes, and its Z SerDes connect to the C slot 108 Z SerDes. Also, Slots A, B, C 104,106,108 can also connect to one another to form a meshed switching architecture according to an exemplary embodiment of the present invention. Note, the FTSI FPGA 30 illustrated herein includes three SerDes connections 51,52,53 allowing for a total of four modules to form a meshed switching architecture capable of TDM and packet connections over the same infrastructure. Those of ordinary skill in the art will recognize that the FTSI FPGA 30 can include addition SerDes connections to enable more modules to form the meshed switching architecture.

Figure 7:
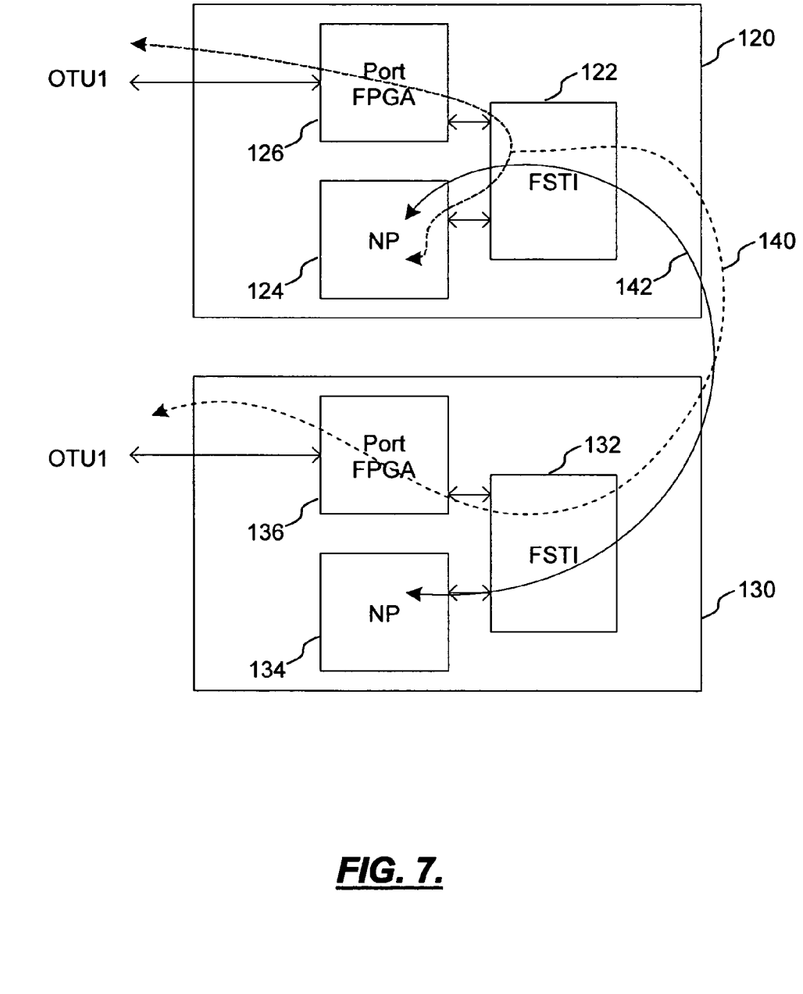
FIG. 7 is a functional block diagram of a hybrid packet-TDM mode between two modules equipped with FTSI FPGAs according to an exemplary embodiment of the present invention.

Referring to FIG. 7, a hybrid packet-TDM mode is illustrated between two modules 120,130 equipped with FTSI FPGAs 122,132 according to an exemplary embodiment of the present invention. The modules 120,130 include the FTSI FPGAs 122,132 which connect between a backplane and port FPGAs 126,136 and NPs 124,134. A protected packet trunk 140 over an OTU1 and a packet-to-packet connection 142 are shown between the modules 120,130. Additionally, the trunk 140 can include TDM traffic that is mapped at the port FPGAs 126,136. For example, portions of the TDM traffic in the trunk 140 are sent to the NP 124 for packet processing, and portions are sent to the FPGA 126 for TDM switching.

Figure 8:
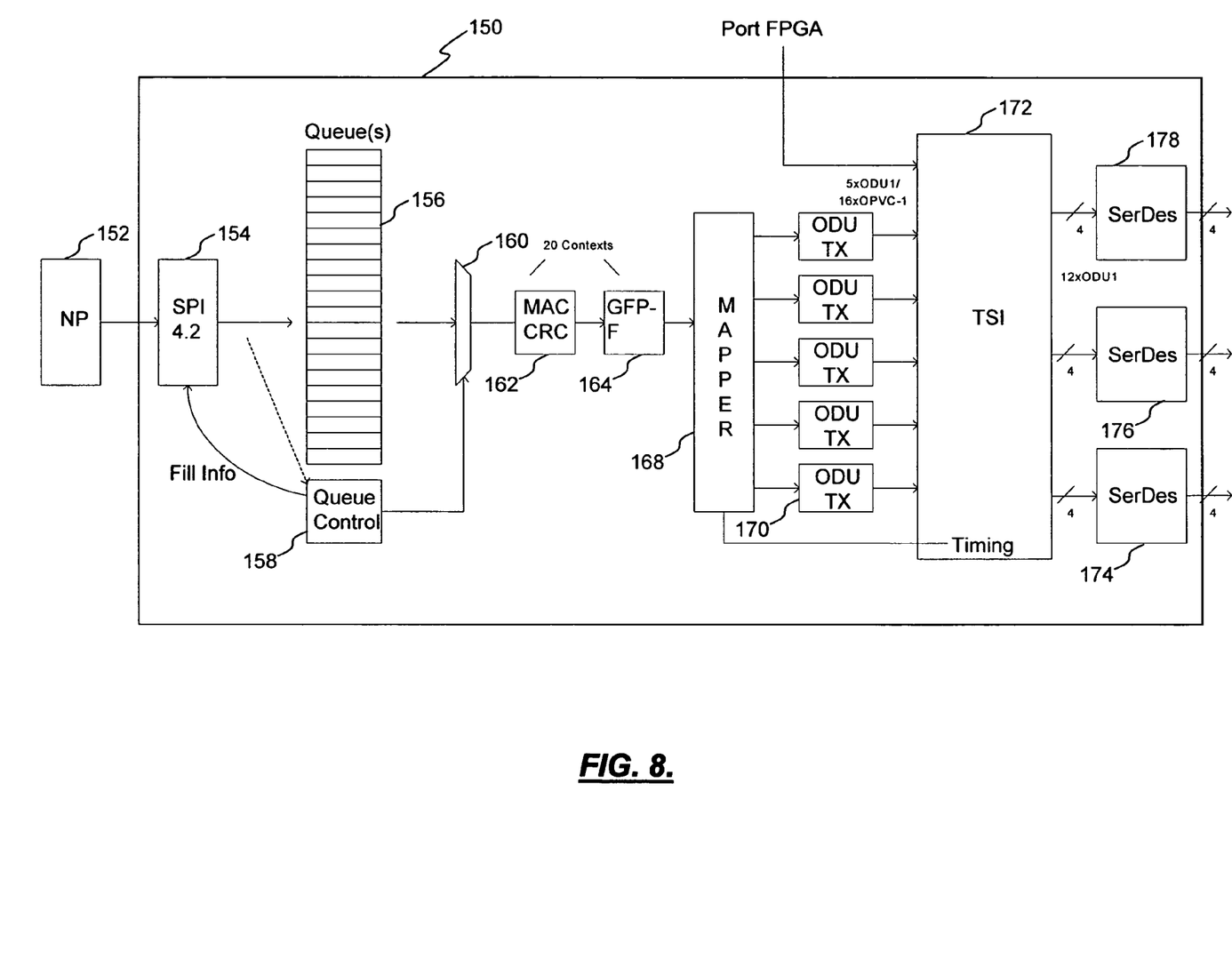
FIG. 8 is a block diagram illustrating the flow from a network processor to a backplane through SerDes in a FTSI FPGA for TDM connections according to an exemplary embodiment of the present invention.

Referring to FIG. 8, an exemplary flow from a network processor 152 to a backplane through SerDes 174,176,178 is illustrated in a FTSI FPGA 150 according to an exemplary embodiment of the present invention. MAC frames from the NP 152 are mapped to GFP-F with proper G.7041 formats for compatibility with a Port FPGA (e.g., for TSI switching). The NP 152 is responsible for padding frames for GFP-F header locations and relative values that are fixed. The FTSI FPGA 150 is responsible for cHEC calculation/insertion in the GFP frame, GFP-F idle generation/insertion, and providing a count of frames per port (or n x OPVC group). Only good (whole) frames are transmitted, and any packets errored from the NP 152 are dropped. To prevent underruns and bad packets from propagating, a queue 156 of some nominal size (e.g., of at least larger than one jumbo frame) is provided after an SPI 4.2 152 interface which connects the NP 152 to the FTSI FPGA 150. The queue 156 connects to a multiplexer 160 and the flow from the queue 156 is controlled by a queue control 158.

The FPGA 150 calculates, generates, and inserts a MAC/CRC 162 prior to GFP-F encapsulation 164 over the timeslots. The CRC is for the standard MAC frame. The NP does not pad frames for CRC location and this is inserted by the FPGA 150. Following GFP-F encapsulation 164, a mapper 168 maps GFP-F frames into one or more ODU Is 170 which are provided to a TSI 172 block for time slot switching and assignment before being providing to the SerDes 174, 176,178 for transport onto the backplane.

Figure 9:
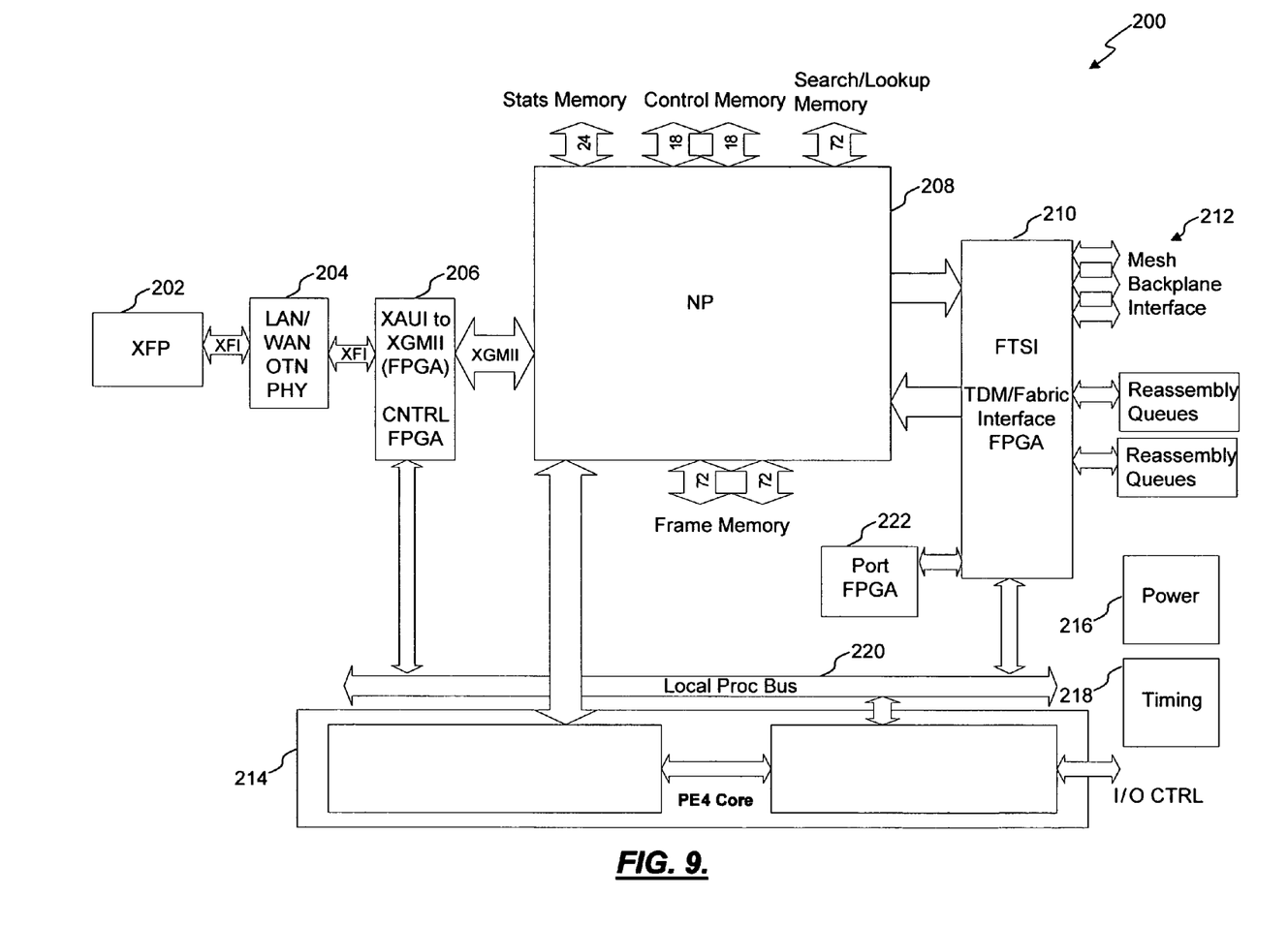
FIG. 9 is a block diagram of a module equipped with an FTSI FPGA fabric configured to provide a meshed backplane switching architecture according to an exemplary embodiment of the present invention.

Referring to FIG. 9, a function diagram of a module 200 equipped with an FTSI FPGA fabric 210 configured to provide a meshed backplane switching architecture is illustrated in an exemplary embodiment of the present invention. An optical interface includes an XFP 202 device, supporting SR/SW, LR/LW, ER/EW, and ZR/ZW laser options, and rates capable of OTU2. The XFP 202 includes multi-source agreement (MSA)-standard XFP cages for card-edge pluggable optics. The XFP 202 connects to a LAN/WAN/OTN PHY 204 block through an XFI interface which is a 10 Gb/s chip-to-chip electrical interface specification defined as part of the XFP MSA. The LAN/WAN/OTN PHY 204 block provides physical layer support for LAN PHY, WAN PHY, and OTN signals. LAN/WAN PHY is used to provide the XGXS/PCS/PMA/PMD functions for 10GE Reconciliation Sublayer (RS) as defined by IEEE 802.3ae. OTN supports OTU2 at standard rates (e.g., 10.7 Gb/s) and extended rates for transparent 10GE LAN PHY transport (e.g., 11.1 Gb/s). The LAN/WAN/OTN PHY 204 block communicates through XFI with a XAUI to XGMII and Control FPGA 206. The FPGA 206 converts between XAUI and XGMII. XGMII and XAUI are standards for connecting full duplex 10 Gigabit Ethernet (10GbE) ports to each other and to other electronic devices. The FPGA 206 connects to a local bus 220 to for TDM-only connections and to a NP 208 through a XGMII connection for packet connections. The NP 208 includes multiple connections to external memory, and is configured to perform layer 2 packet processing. The NP 208 connects to the FTSI FPGA 210 through an SPI 4.2 interface. The FTSI FPGA 210 provides a meshed switching architecture 212 to a backplane configured to receive both TDM and packet connections. Packet and TDM connections containing packet traffic are provided to the NP 208 and TDM-only connections are provided to the FPGA 206 through the bus 220. A Port FPGA 222 provides mapping for TDM traffic. Additionally, the module 200 includes other functions such as a PE4 core 214, power 216, and timing 218.

Figure 10:
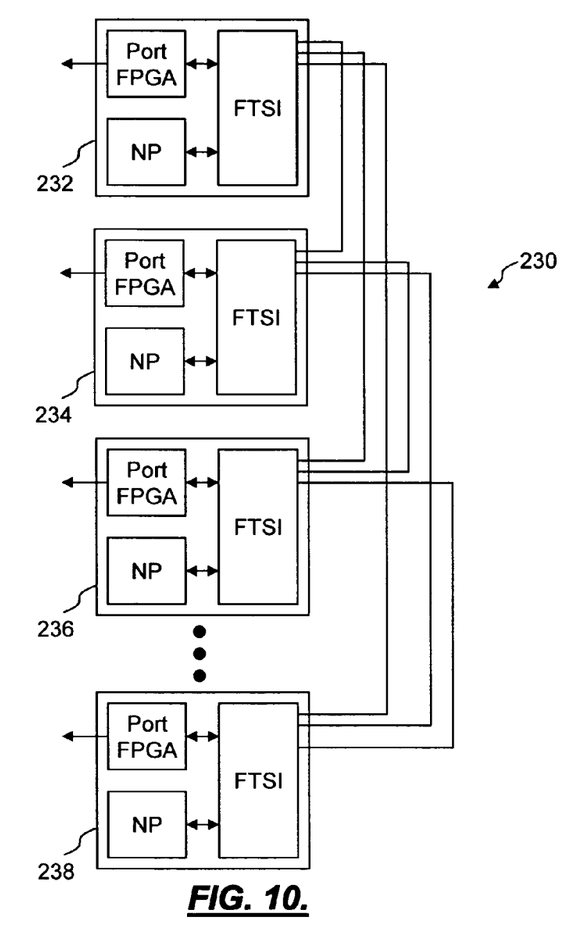
FIG. 10 is a block diagram of a meshed switching architecture according to an exemplary embodiment of the present invention.

Referring to FIG. 10, a meshed switching architecture 230 is illustrated according to an exemplary embodiment of the present invention. Line modules 232,234,236,238 are configured to connect to a backplane or the line in the meshed switching architecture 230. Each line module 232,234,236, 238 includes an FTSI FPGA, NP, and Port FPGA as described herein. The FTSI FPGA provides an interface to the meshed switching architecture 230 and the Port FPGA and NP. The FTSI FPGA provides TDM switching and packet support. The Port FPGA provides mapping, and the NP provides packet processing. The present invention supports native TDM and packet switching simultaneously over the meshed switching architecture 230. The switching architecture 230 includes meshed links common to both TDM and packet traffic with the links terminating to the same FTSI FPGA, eliminating the need for separate physical resources and infrastructure. Advantageously, the FTSI FPGA can include multiple links to support additional line modules 232,234, 236,238 in the switching architecture 230.

Figure 11:
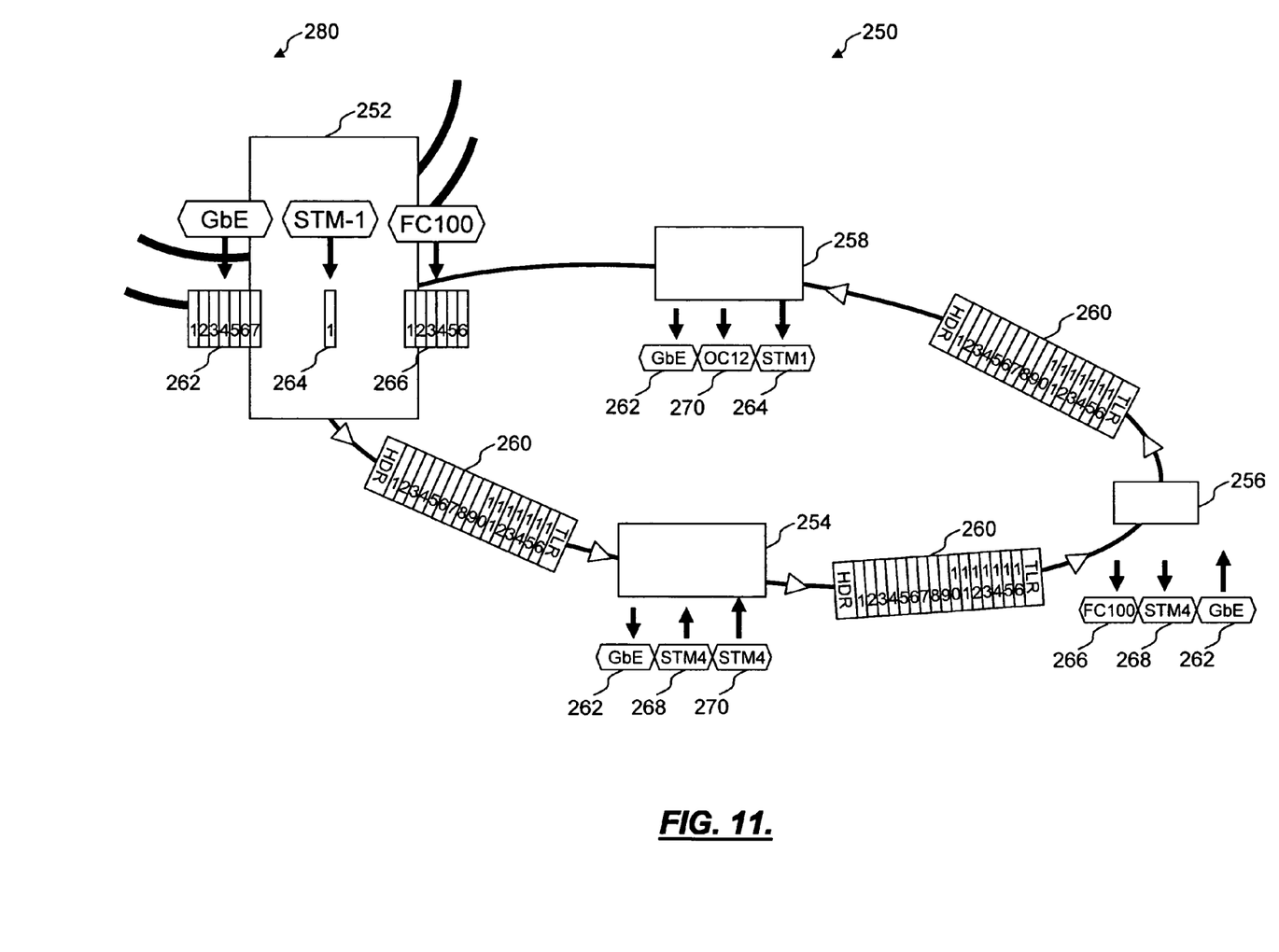
FIG. 11 is a diagram of an exemplary network configured with the meshed switching architecture according to an exemplary embodiment of the present invention.

Referring to FIG. 11, an exemplary network 250 is illustrated configured with the meshed switching architecture according to an exemplary embodiment of the present invention. For example, the network 250 can be a coarse or dense-wave division multiplexed (C/DWDM) network transmitting at an OTU1 (2.7 Gb/s) rate. The network 250 includes an optical-electrical-optical (OEO) optical switch 252, aggregation platforms 254,258, and a small-form factor aggregation platform 256. The optical switch 252 is also part of another network 280, such as a core network, and provides a connection between the networks 250,280. All of the elements 252, 254,256,258 include a meshed switching architecture as described herein enabling each element to transport and aggregate TDM and packet connections over the same links without requiring separate infrastructure.

As described herein, the network 250 extends the OTN standards to provide channelized ODU1s into 155 Mb/s timeslots. TDM switching is performed on these timeslots. At an OTU1 line rate, there are 16 timeslots, and 64 timeslots at an OTU2 line rate. Multiple services, including Gigabit Ethernet (GbE) 262, STM-1 264, Fibre Channel (FC100) 266, and STM-4/OC-12 268,270, are transparently or frame mapped into an optimal number of timeslots, and all of the multiple services share a single wavelength 260.

The meshed switching architecture of the present invention enables each of the elements 252,254,256,258 to switch the wavelength 260 with the same infrastructure for both TDM time slot switching and packet processing. The FTSI FPGA described herein allows the backplane connection to receive the wavelength 260 and to send the TDM and packet connections to appropriate circuitry for processing Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A meshed switching architecture supporting time division multiplexed and packet connections over common links, comprising:
   a plurality of connections in a mesh configuration between a first slot and one or more slots; and
   first circuitry on the first slot and each of the one or more slots connected to the plurality of connections, wherein the first circuitry is configured to provide an interface between each of the plurality of connections and between second circuitry on the first slot and each of the one or more slots;
   wherein the second circuitry comprises packet processing circuitry and time slot mapping circuitry;
   wherein the first slot and the one or more slots are each configured to accept both packet and time division multiplexed cards simultaneously; and
   wherein the plurality of connections support packet and time division multiplexed connections with separate switching of both the packet and the time division multiplexed connections and with transporting the packet and the time division multiplexed connections together within separate connections of the plurality of connections.

2. The meshed switching architecture of claim 1, wherein the plurality of connections are over a backplane.

3. The meshed switching architecture of claim 1, wherein the first circuitry comprises a field programmable gate array.

4. The meshed switching architecture of claim 1, wherein the first circuitry is configured to on a per-meshed connection to:
   operate in a time division multiplex only mode supporting only time division multiplex connections with time slot interchange functionality;
   operate in a bypass mode supporting only packet connections bypassing time slot interchange functionality; and
   operate in a hybrid mode with both time division multiplex with time slot interchange functionality and packet connections.

5. The meshed switching architecture of claim 4, further comprising a plurality of logical and physical channels, wherein in the hybrid mode, each of the plurality of logical and physical channels is classified one of packet and time division multiplex, and wherein the circuitry processes each of the plurality of logical and physical channels according to the classification.

6. The meshed switching architecture of claim 1, wherein the first circuitry is configured to:
   provide packet connections to a network processor through a system packet interface;
   frame packet connections in a Generic Framing Protocol-Frame format; and
   provide time division multiplexed connections to circuitry configured to perform time slot interchange functionality.

7. The meshed switching architecture of claim 1, wherein each of the plurality of connections comprises a serialized-de-serialized (SerDes) connection, and wherein the first slot comprises a SerDes connection to each of the one or more slots.

8. The meshed switching architecture of claim 1, wherein the time division multiplexed connections utilize Optical Transport Network framing.

9. A meshed switching circuit supporting time division multiplexed and packet connections over common links, comprising:
   a plurality of serializer/de-serializers (SerDes) configured to transmit and receive a plurality of packet and time division multiplexed connections separately over common links, wherein each of the packet and time division multiplexed connections are separately transported in a common Optical Transport Network (OTN) connection;
   a packet interface configured to transmit and receive the plurality of packet connections to packet processing circuitry external to the circuit; and
   a port interface configured to transmit and receive the plurality of time division multiplexed to circuitry for time slot interchange switching;
   wherein the plurality of SerDes connect to a backplane in a mesh configuration; and wherein the backplane is connected to a plurality of slots that are each configured to accept both time division multiplexed and packet cards simultaneously.

10. The meshed switching circuit of claim 9, wherein the circuit is located on a card which connects to the backplane.

11. The meshed switching circuit of claim 10, wherein the backplane connects a plurality of cards with each of the plurality of cards connecting to the remaining plurality of cards through one of the plurality of SerDes.

12. The meshed switching circuit of claim 9, wherein the packet interface comprises a System packet interface, and the packet processing circuitry comprises a network processor.

13. The meshed switching circuit of claim 9, wherein the circuit is configured to on a per-meshed connection to:
  operate in a time division multiplex only mode supporting only time division multiplex connections with time slot interchange functionality;
  operate in a bypass mode supporting only packet connections bypassing time slot interchange functionality; and
  operate in a hybrid mode with both time division multiplex and packet connections.

14. The meshed switching circuit of claim 9, wherein the time division multiplexed connections utilize Optical Transport Network framing.

15. A network element with a meshed backplane switching architecture supporting time division multiplexed and packet connections over common links, comprising:
  a plurality of slots connected through a backplane; and a plurality of line cards configured to connect to the backplane each through one of the plurality of slots, each of the line cards configured to provide separate switching of time division multiplexed and packet connections;
  wherein the plurality of slots are each configured to accept both time division multiplexed and packet line cards simultaneously;
  wherein each of the plurality of line cards comprises a Fabric-Timeslot Exchanger circuit configured to:
  serialize and de-serialize a plurality of connections to the backplane, wherein the connections comprise time division multiplexed and packet connections;
  interface packet connections to an external packet processor through a system packet interface;
  frame packet connections into Generic Frame Protocol-Frame (GFP-F); perform time slot switching for the time division multiplexed connections;
  and
  combine the packet and time division multiplexed connections over the plurality of connections; and
  wherein the time division multiplexed and packet connections are transported in separate connections within a common Optical Transport Network (OTN) connection.

16. The network element with a meshed backplane switching architecture of claim 15, wherein the time slot switching comprises switching Optical channel Payload Virtual Containers in Optical Transport Network (OTN).

17. The network element with a meshed backplane switching architecture of claim 15, wherein each of the plurality of line cards connects to the each of the other plurality of line cards through one of the plurality of connections.

18. The network element with a meshed backplane switching architecture of claim 15, wherein the plurality of connections form a meshed backplane switching architecture.

* * * * *